United States Patent
Lin et al.

(10) Patent No.: US 12,105,899 B1
(45) Date of Patent: Oct. 1, 2024

(54) METHOD FOR ESTIMATING STYLUS POSITION AND STYLUS

(71) Applicant: Acer Incorporated, New Taipei (TW)

(72) Inventors: Shang-Yao Lin, New Taipei (TW); Ting-Wei Yuan, New Taipei (TW); Chao-Shih Huang, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

(21) Appl. No.: 18/457,375

(22) Filed: Aug. 29, 2023

(30) Foreign Application Priority Data

Jun. 27, 2023 (TW) .................................. 112123881

(51) Int. Cl.
*G06F 3/0354* (2013.01)
*G06F 3/03* (2006.01)
*G06F 3/0346* (2013.01)
*G06T 7/80* (2017.01)

(52) U.S. Cl.
CPC ........ *G06F 3/03545* (2013.01); *G06F 3/0325* (2013.01); *G06F 3/0346* (2013.01); *G06T 7/80* (2017.01)

(58) Field of Classification Search
CPC ............... G06F 3/03545; G06F 3/0325; G06F 3/0346; G06T 7/80
See application file for complete search history.

(56) References Cited

U.S. PATENT DOCUMENTS

| | | | |
|---|---|---|---|
| 8,724,090 B2 | 5/2014 | Samadani et al. | |
| 11,630,570 B2 * | 4/2023 | Kumami | G06F 3/017 |
| | | | 345/179 |
| 2010/0328200 A1 * | 12/2010 | Yu | G06F 3/0386 |
| | | | 345/156 |
| 2011/0227827 A1 * | 9/2011 | Solomon | G06F 3/0346 |
| | | | 345/158 |
| 2018/0275854 A1 * | 9/2018 | Ikeda | G06F 3/0425 |

FOREIGN PATENT DOCUMENTS

| | | |
|---|---|---|
| CN | 113608709 | 11/2021 |
| CN | 109923513 | 6/2022 |
| CN | 113176834 | 3/2023 |
| TW | I643118 | 12/2018 |

* cited by examiner

*Primary Examiner* — Rodney Amadiz
(74) *Attorney, Agent, or Firm* — JCIPRNET (57) ABSTRACT

A method for estimating stylus position and a stylus are provided. The method includes the following operation. An image is captured towards a display through an image capturing device disposed on a stylus. A distance between the stylus and the display is detected through a distance sensor disposed on the stylus. A display bezel of the display in the image is detected. A spatial position of the stylus relative to the display is determined according to the display bezel in the image and the distance.

15 Claims, 6 Drawing Sheets

|     |     |     |     |     |     |     |     |
|-----|-----|-----|-----|-----|-----|-----|-----|
| d00 | d01 | d02 | d03 | d04 | d05 | d06 | d07 |
| d10 | d11 | d12 | d13 | d14 | d15 | d16 | d17 |
| d20 | d21 | d22 | d23 | d24 | d25 | d26 | d27 |
| d30 | d31 | d32 | d33 | d34 | d35 | d36 | d37 |
| d40 | d41 | d42 | d43 | d44 | d45 | d46 | d47 |
| d50 | d51 | d52 | d53 | d54 | d55 | d56 | d57 |
| d60 | d61 | d62 | d63 | d64 | d65 | d66 | d67 |
| d70 | d71 | d72 | d73 | d74 | d75 | d76 | d77 |

METHOD FOR ESTIMATING STYLUS POSITION AND STYLUS

CROSS-REFERENCE TO RELATED APPLICATION

This application claims the priority benefit of Taiwan application Ser. No. 112123881, filed on Jun. 27, 2023. The entirety of the above-mentioned patent application is hereby incorporated by reference herein and made a part of this specification.

BACKGROUND

Technical Field

The disclosure relates to a stylus system, and more particularly, to a method for estimating stylus position and a stylus.

Description of Related Art

Generally, fingers and stylus are the most common input tools used by users for touch operations. Due to the finer and more precise strokes it can produce, a stylus is more suitable for drawing scenarios or specific situations. However, as electronic devices become more feature-rich, the direct touch operation of simply using a stylus to touch the screen is gradually becoming insufficient to meet user operational needs. For example, a stylus needs to be close enough to the touchscreen to be effective, which directly limits the actual distance between the user and the electronic device. Thus, how to provide more diverse control methods through a stylus is a topic of concern for professionals in this field.

SUMMARY

In view of this, the disclosure proposes method for estimating stylus position and a stylus, which may accurately obtain a spatial position of the stylus relative to the display, so as to provide more control methods based on the spatial position of the stylus relative to the display.

The embodiment of the disclosure provides a method for estimating the stylus position, which is described below. An image is captured towards a display through an image capturing device disposed on a stylus. A distance between the stylus and the display is detected through a distance sensor disposed on the stylus. A display bezel of the display in the image is detected. A spatial position of the stylus relative to the display is determined according to the display bezel in the image and the distance.

The embodiment of the disclosure provides a stylus, which includes an image capturing device, a distance sensor, and a controller. The controller is coupled to the image capturing device and the distance sensor and is used to execute the following process. An image is captured towards a display through an image capturing device disposed on a stylus. A distance between the stylus and the display is detected through a distance sensor disposed on the stylus. A display bezel of the display in the image is detected. A spatial position of the stylus relative to the display is determined according to the display bezel in the image and the distance.

Based on the above, in the embodiment of the disclosure, the image capturing device disposed on the stylus may capture the image towards the display, and the distance sensor may detect the distance between the stylus and the display. According to the display bezel of the display in the image and the distance, the spatial position of the stylus relative to the display may be estimated. Thus, the spatial position of the stylus relative to the display may be used to execute control functions, so as to increase the diversification of the usage of the stylus.

In order to make the above-mentioned features and advantages of the disclosure comprehensible, embodiments accompanied with drawings are described in detail below.

DESCRIPTION OF THE EMBODIMENTS

Some embodiments of the disclosure accompanied with the drawings will now be described in detail. These examples are only a portion of the disclosure and do not disclose all possible embodiments of the disclosure. More precisely, these embodiments are only examples of the method and system within the scope of the patent application of the disclosure.

Figure 1:
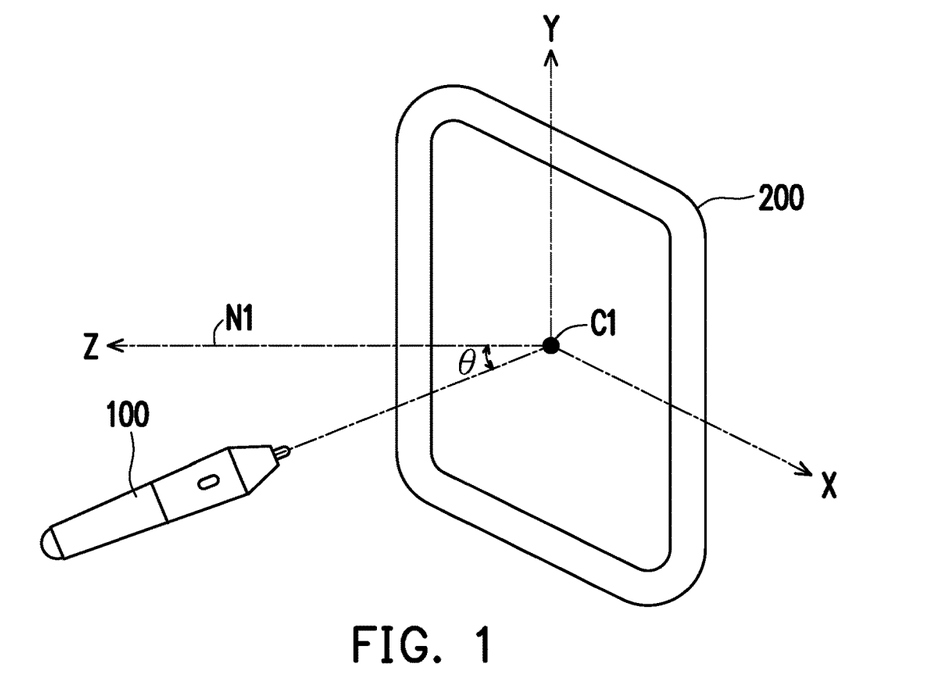
FIG. 1 is a schematic view of a stylus and a display according to an embodiment of the disclosure.

FIG. 1 is a schematic view of a system for estimating stylus position according to an embodiment of the disclosure. Referring to FIG. 1, the system 10 for estimating stylus position includes a stylus 100 and a display 200. The display 200 is, for example, a touch screen of a smart phone, a tablet computer, a laptop, an e-book, a game console, or a desktop computer, and the disclosure is not limited thereto. The display 200 is, for example, a liquid crystal display (LCD), a thin film transistor (TFT)-LCD, an organic light-emitting diodes (OLED), a flexible display, a three-dimensional (3D) display, etc., but not limited thereto. Generally, the user may use the stylus 100 to perform touch input operations on the touch display 200.

It should be noted that in the embodiment of the disclosure, according to sensing data of various sensors on the stylus 100, the spatial position of the stylus 100 relative to the display 200 may be located. In some embodiments, the spatial position of the stylus 100 relative to a screen center C1 of the display 200 may be located. According to the sensing data of various sensors on the stylus 100, tilt status of the stylus 100 may also be obtained. Thus, even if the touch panel of the display 200 does not sense the contact or approach of the stylus 100, the user may also issue user operations to the electronic device including the display 200 by changing the gesture of holding the stylus 100. For example, in response to the touch panel of the display 200 not sensing the contact or approach of the stylus 100, the user may change the spatial position and tilt status of the stylus 100 by changing the gesture of holding the stylus 100, so as to interact with the display object of the display 200 by the gesture of holding the stylus 100.

Figure 2:
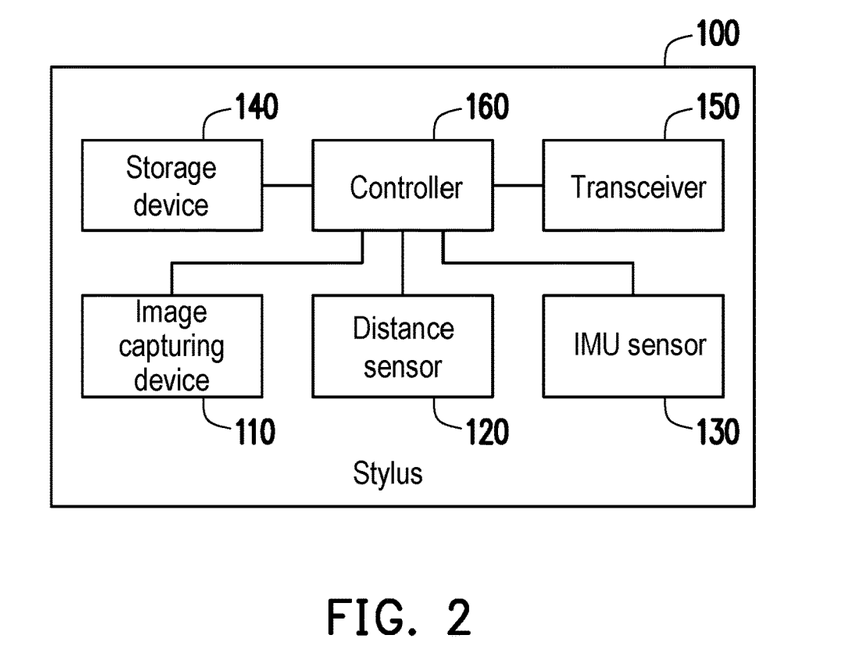
FIG. 2 is a block diagram of a stylus according to an embodiment of the disclosure.

FIG. 2 is a block diagram of a stylus according to an embodiment of the disclosure. Referring to FIG. 2, the stylus 100 includes an image capturing device 110, a distance sensor 120, an inertial measurement unit (IMU) sensor 130, a storage device 140, a transceiver 150 and a controller 160.

The image capturing device 110 is configured to capture images, which may include a lens, an image sensor, and other components. The image sensor is configured to provide an image sensing function, which may include a photosensitive element, such as a charge coupled device (CCD), a complementary metal-oxide semiconductor (CMOS) element, or other elements, and the disclosure is not limited thereto. The lens may converge imaging lights onto the image sensor to achieve the purpose of capturing images. In some embodiments, the image capturing device 110 may include a fisheye lens or a wide-angle lens. In some embodiments, the image capturing device 110 may be disposed at a position close to the tip of the stylus 100. Thus, in response to the tip of the stylus 100 pointing at the display 200, the image capturing device 110 may capture an image towards the display 200.

The distance sensor 120 is configured to detect a distance between the stylus 100 and the display plane of the display 200. The distance sensor 120 may be an ultrasonic distance sensor, an infrared distance sensor, a laser light distance sensor, or other types of distance sensors. In some embodiments, the distance sensor 120 may include a multi-zone Time of Flight (TOF) distance sensor, and may provide measurement distance of multiple measurement areas. In some embodiments, the distance sensor 120 may be disposed at a position close to the tip of the stylus 100. Thus, in response to the tip of the stylus 100 pointing at the display 200, the distance sensor 120 may detect the distance between the tip of the stylus 100 and the display plane of the display 200.

The inertial measurement unit sensor (IMU sensor) 130 is configured to sense the exercise state of the stylus 100, such as an angular velocity and an acceleration. The IMU sensor 130 may include a gyroscope, an accelerometer, a magnetometer, or a combination of the foregoing.

The storage device 140 is configured to store data or a software module or command to be accessed by the controller 160, which may be, for example, any type of fixed or removable random access memory (RAM), read-only memory (ROM), flash memory, or a combination of the foregoing.

The transceiver 150 may transmit and receive signals in a wireless or wired manner. The transceiver 150 may also perform operations such as low-noise amplification, impedance matching, frequency mixing, up or down frequency conversion, filtering, amplification, and the like. The stylus 100 may communicate with the electronic device including the display 200 through the transceiver 150 to receive and transmit data.

The controller 160 is coupled to the image capturing device 110, the distance sensor 120, the IMU sensor 130, the storage device 140, and the transceiver 150 to control the overall operation of the stylus 100. The relevant functions of the controller 160 may be implemented in one or more controllers, micro-controllers, micro-processors, Application-specific integrated circuits (ASICs), digital signal processors (DSPs), Field Programmable Gate Arrays (FPGAs), and/or logic blocks, modules, and circuits in other controller units.

However, in addition to the elements shown in FIG. 2, the stylus 100 may also include other elements, such as a pressure sensor, a power management circuit, a vibration element, or a button, and the disclosure is not limited thereto.

Figure 3:
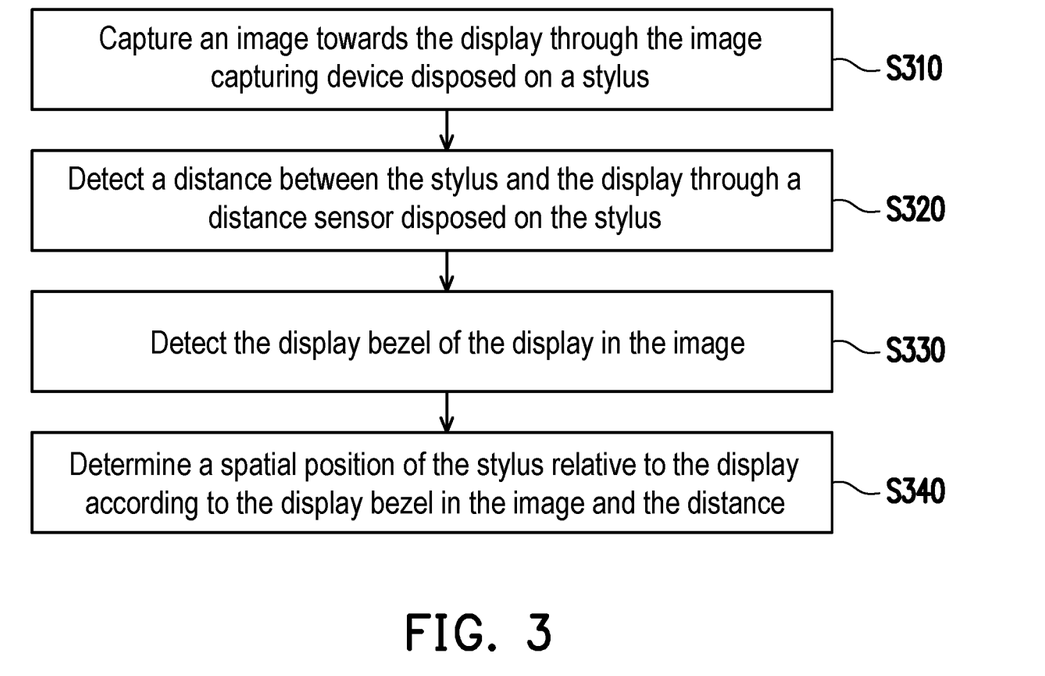
FIG. 3 is a flow chart of a method for estimating stylus position according to an embodiment of the disclosure.

FIG. 3 is a flow chart of a method for estimating stylus position according to an embodiment of the disclosure. Referring to FIG. 3, the method of this embodiment is applicable to the stylus 100 in FIG. 1 and FIG. 2. The following are the detailed steps of the method for estimating stylus position of the disclosure, explained in accordance with the various components of the stylus 100.

In step S310, the controller 160 captures an image towards the display 200 through the image capturing device 110 disposed on a stylus 100. Specifically, in response to the stylus 100 being held by the user and pointed to the display 200, the image capturing device 110 on the stylus 100 may capture an image toward the display 200. In some embodiments, the image capturing device 110 may include a fisheye lens. The field of view (FOV) of the fisheye lens may exceed 180 degrees, so that the probability of capturing an image that does not include the display 200 is greatly reduced. In some embodiments, the image capturing device 110 may continuously capture image sequences according to a capture frame rate.

In step S320, the controller 160 detects a distance between the stylus 100 and the display 200 through a distance sensor 120 disposed on the stylus 100. Specifically, in response to the stylus 100 being held by the user and pointed to the display 200, the distance sensor 120 on the stylus 100 may detect the distance between the stylus 100 and the display plane of the display 200 instantly. The light, the ultrasonic wave, or other electromagnetic signals emitted by the distance sensor 120 may be displayed on the display plane of the display 200. The distance sensor 120 may sense the reflective light ray, the reflective ultrasonic wave, or other reflective electromagnetic signals reflected by the display 200 to obtain the distance between the stylus 100 and the display 200.

In step S330, the controller 160 detects the display bezel of the display 200 in the image. In some embodiments, the controller 160 may detect the display 200 in the image according to a pre-trained object recognition model, so as to further obtain the display bezel of the display 200 in the image. The aforementioned object recognition model is a machine learning model trained according to a machine learning algorithm, such as a convolutional neural network model, a Yolo model, or an image segmentation model. In some embodiments, the controller 160 may detect edges in the image through an edge detection algorithm and further detect the straight edges. Afterwards, the controller 160 may detect the display bezel in the image according to the dimension of the display 200 (e.g., the aspect ratio). In addition, in some embodiments, the screen edge or the screen corner of the display 200 presents a recognition mark (e.g., a barcode or a specific pattern). The controller 160 may locate the display bezel of the display 200 in the image by detecting the recognition mark in the image. In some embodiments, the recognition mark may be implemented as a sticker attached to the display 200, or the display 200 may display the recognition mark by itself.

In step S340, the controller 160 determines a spatial position of the stylus 100 relative to the display 200 according to the display bezel in the image and the distance. In some embodiments, the spatial position of the stylus 100 relative to the display 200 may be represented by the coordinate position of the world coordinate system. In some embodiments, the center C1 of the display 200 as an original point of the world coordinate system is taken as an example. The Z axial direction (i.e., the third axial direction) of this world coordinate system is the normal direction N1 of the display plane of the display 200. The X axial direction (i.e., the first axial direction) of the world coordinate system is the X direction of the display plane of the display 200. The Y axial direction (i.e., the second axial direction) of the world coordinate system is the Y direction of the display plane of the display 200. The controller 160 may determine the Z-axis coordinate component of the stylus 100 in the world coordinate system according to the distance sensed by the distance sensor 120. Moreover, the controller 160 may determine the X-axis coordinate component and the Y-axis coordinate component of the stylus 100 in the world coordinate system according to the imaging status of the display bezel in the image (e.g., imaging position, imaging size, and imaging integrity).

Thus, after locating the spatial position of the stylus 100 relative to the display 200, the controller 160 may execute a function according to the spatial position. In some embodiments, the stylus 100 may perform an interacting operation with the electronic device including the display 200 according to the spatial position relative to the display 200. Specifically, the controller 160 may transmit the aforementioned spatial position to the electronic device including the display 200 through the transceiver 150, so as to interact with the aforementioned electronic device. For example, in response to the display 200 displaying a 3D object model, the user may drag or rotate the 3D object model by moving the stylus 100.

In addition, it should be noted that the above embodiment is described by taking the stylus 100 as the execution body as an example, but the disclosure is not limited thereto. In other embodiments, the stylus 100 may provide the distance detected by the distance sensor 120 and the image captured by the image capturing device 110 to the electronic device including the display 200, so that the electronic device determines the spatial position of the stylus 100 relative to the display 200.

Figure 4:
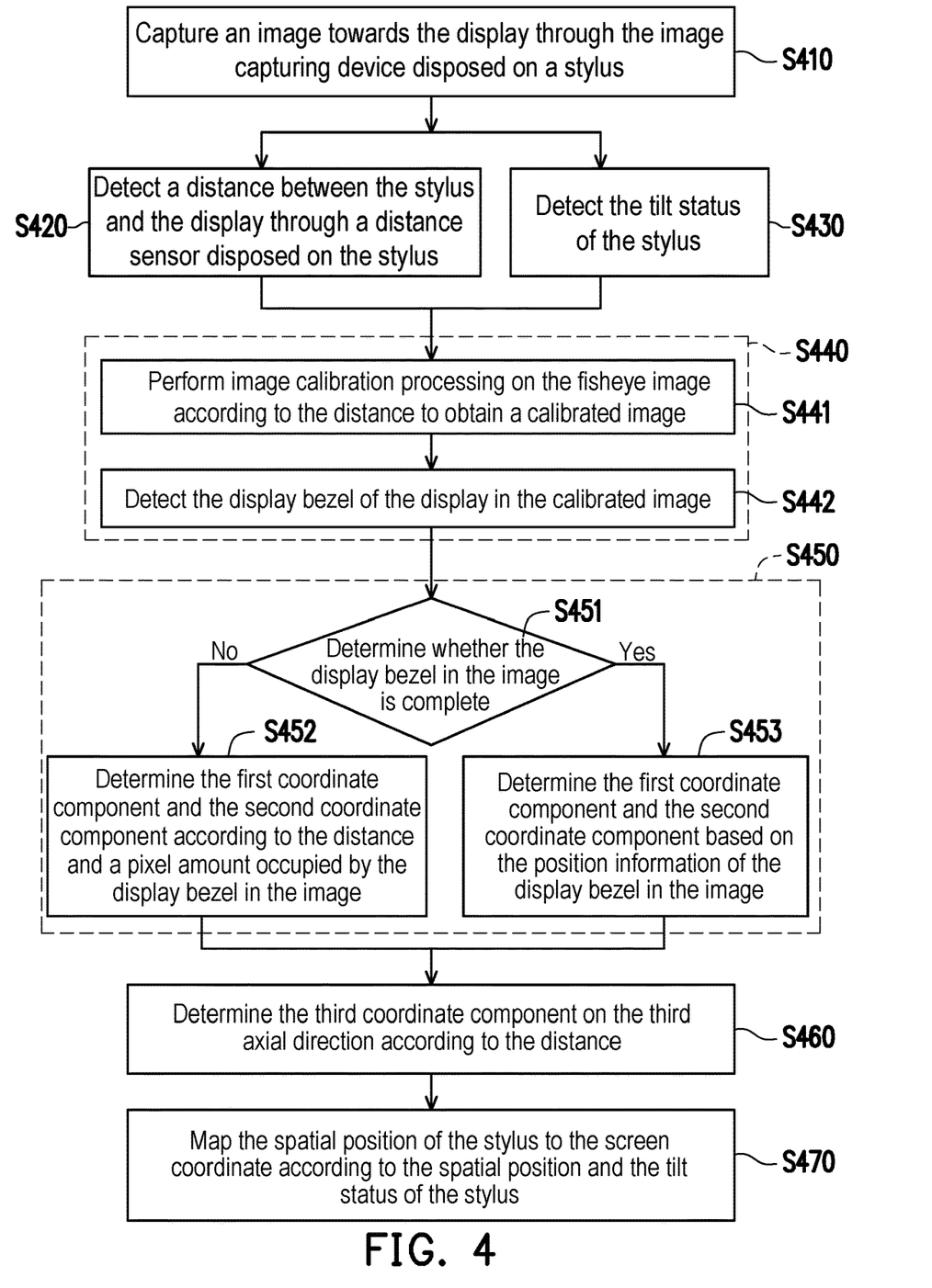
FIG. 4 is a flow chart of a method for estimating stylus position according to an embodiment of the disclosure.

FIG. 4 is a flow chart of a method for estimating stylus position according to an embodiment of the disclosure. Referring to FIG. 4, the method of this embodiment is applicable to the stylus 100 in FIG. 1 and FIG. 2. The following are the detailed steps of the method for estimating stylus position of the disclosure, explained in accordance with the various components of the touching system 10.

In step S310, the controller 160 captures an image towards the display 200 through the image capturing device 110 disposed on the stylus 100. In step S320, the controller 160 detects a distance between the stylus 100 and the display 200 through the distance sensor 120 disposed on the stylus 100. The detailed implementation of step S410 to step S420 has been clearly described in the embodiment of FIG. 3, and will not be repeated herein.

In step S430, the controller 160 detects the tilt status of the stylus 100. In some embodiments, the tilt status of the stylus 100 includes a relative angle θ of the pointing direction of the stylus 100 relative to the normal direction N1 of the display plane of the display 200. In other words, in response to the relative angle θ being 0 degrees, it means that the stylus 100 is pointing perpendicular to the display plane of the display 200. The tilt status of the stylus 100 depends on the gesture of the user holding the stylus 100.

In some embodiments, the IMU sensor 130 is disposed on the stylus 100 for detecting the tilt status of the stylus 100. Specifically, the controller 160 may calculate the angle of the stylus 100 relative to the ground plane according to the sensing data of the gyroscope, so as to obtain the tilt status of the stylus 100. In some embodiments, in response to the included angle between the display plane of the display 200 and the ground plane being known, the controller 160 may further obtain the relative angle θ of the pointing direction of the stylus 100 relative to the normal direction N1 of the display plane of the display 200.

In some embodiments, the distance sensor 120 includes a multi-zone TOF distance sensor, and the multi-zone TOF distance sensor is used to detect the tilt status of the stylus 100. Specifically, the multi-zone TOF distance sensor may perform multiple independent distance measurements and obtain distance measurement results for different measuring regions. In other words, the multi-zone TOF distance sensor may include sensing arrays corresponding to different measuring regions.

Figure 5:
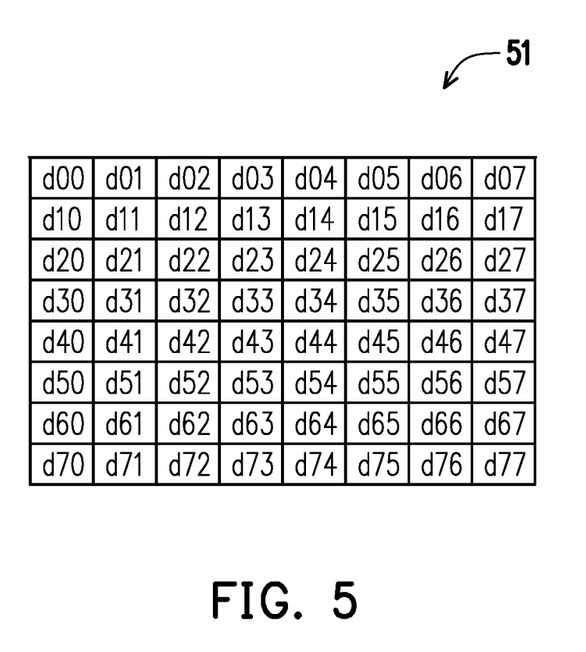
FIG. 5 is a schematic view of depth sensing data according to an embodiment of the disclosure.

For example, FIG. 5 is a schematic view of depth sensing data according to an embodiment of the disclosure. Referring to FIG. 5, the multi-zone TOF distance sensor is, for example, an 8*8 multi-zone TOF distance sensor. Depth sensing data 51 output by the multi-zone TOF distance sensor may include depth sensing values d00~d77 corresponding to 64 measuring regions. The distance sensor 120 is disposed near the tip of the stylus 100 and may be used to measure the distance between the tip and the display 200.

It is known that in response to the pointing direction of the stylus 100 being nearly perpendicular to the display plane of the display 200, the depth sensing values associated with the display 200 (e.g., the depth sensing values d00~d77) in the depth sensing data 51 are similar and do not vary significantly from each other. In contrast, in response to the relative angle θ of the pointing direction of the stylus 100 relative to the normal direction N1 of the display plane of the display 200 being significant, noticeable differences are presented in the depth sensing values (e.g., depth sensing values d00~d77) associated with the display 200 in the depth sensing data 51. Furthermore, the size of the depth sensing values associated with the display 200 is related to the orientation of the stylus 100. Thus, by analyzing the depth sensing values in the depth sensing data 51, the controller 160 may obtain the tilt status of the stylus 100. In addition, according to the compared results of the depth sensing values in the depth sensing data 51, the controller 160 may also determine whether each of the depth sensing data in the depth sensing data 51 is generated in response to the display 200. For example, it is supposed that the difference between the first row of depth sensing values, d00, d10, . . . , d70, and the other depth sensing values exceeds a threshold. This indicates that the first row of depth sensing values, d00, d10, . . . , d70 are depth information that does not correspond to the display 200. In other words, the first row of depth sensing values d00, d10, . . . , d70, are not generated based on the reflective light or reflective signals from the display 200.

In step S440, the controller 160 detects the display bezel of the display 200 in the image. In some embodiments, the image capturing device 110 includes a fisheye lens, and the image captured by the image capturing device 110 includes a fisheye image. Step S440 may be implemented as step S441 and step S442.

In step S441, the controller 160 performs image calibration processing on the fisheye image according to the distance to obtain a calibrated image. In step S442, the controller 160 detects the display bezel of the display 200 in the calibrated image. Specifically, according to the distance (i.e., depth information) sensed by the distance sensor 120 and feature points in the fisheye image, the controller 160 may use camera calibration technology or geometric reasoning method to accurately estimate the fisheye distortion parameters. The fisheye distortion parameters may include distortion center, field of view, radial/tangential distortion coefficient, etc. Afterwards, according to these fisheye distortion parameters, the controller 160 may project the fisheye image onto a plane and inversely transform the distortion, so as to obtain a calibrated image. The image object in the calibrated image may be restored to the true shape and size thereof. Thus, the controller 160 may detect the display bezel of the display 200 in the calibrated image through the method mentioned in the aforementioned embodiment.

In this embodiment, the spatial position of the stylus 100 relative to the display 200 may include the first coordinate component on the first axial direction, the second coordinate component on the second axial direction, and the third coordinate component on the third axial direction. The third axial direction is the normal direction of the display plane of the display 200. The first axial direction, the second axial direction, and the third axial direction are perpendicular to each other. Taking FIG. 1 as an example, the first axial direction is the X axial direction; the second axial direction is the Y axial direction; and the third axial direction is the Z axial direction.

In step S450, the controller 160 determines the first coordinate component on the first axial direction and the second coordinate component on the second axial direction according to the display bezel in the image (i.e., the calibrated image). Step S450 may be implemented as step S451 and step S453.

In step S451, the controller 160 determines whether the display bezel in the image is complete. In other words, the controller 160 determines that the image includes a part of the display bezel or the entire display bezel. In some embodiments, the controller 160 may determine whether the display bezel in the image is a closed quadrilateral to determine whether the display bezel is complete.

If step S451 is determined to be true, in step S453, in response to the display bezel in the image being complete, the controller 160 determines the first coordinate component and the second coordinate component based on the position information of the display bezel in the image. The position information of the display bezel in the image may include the corner position of any corner of the display bezel. Alternatively, the position information of the display bezel in the image may include the center point position of the center point of the display bezel. In some embodiments, the controller 160 may determine the first coordinate component and the second coordinate component of the stylus 100 in the world coordinate system according to the position information of the display bezel through a lookup table. In some embodiments, the controller 160 may determine the first coordinate component and the second coordinate component of the stylus 100 in the world coordinate system according to the ratio between the two vertical bezels of the display bezel. Alternatively, in some embodiments, the controller 160 may determine the first coordinate component and the second coordinate component of the stylus 100 in the world coordinate system according to the ratio between the two horizontal bezels of the display bezel.

Figure 6A:
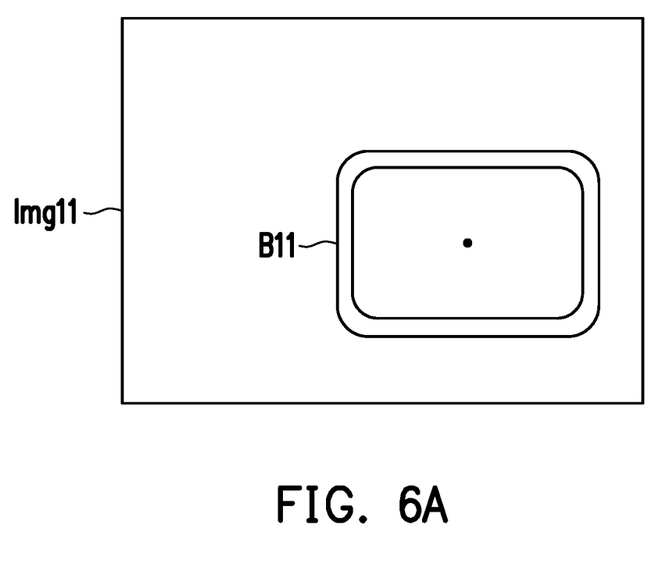
FIG. 6A and FIG. 6B are schematic views of a display bezel in an image according to an embodiment of the disclosure.

FIG. 6A is a schematic view of a display bezel in an image according to an embodiment of the disclosure. Referring to FIG. 6A, the controller 160 may determine that a display bezel B11 in an image Img11 is complete. Thus, according to the position information of the center point of the display bezel B11 in the image Img11 (e.g., the pixel coordinate of a center point C11), the controller 160 may estimate the X coordinate component and the Y coordinate component of the stylus 100 relative to the display 200.

If step S451 is determined to be false, in step S452, in response to the display bezel in the image being incomplete, the controller 160 determines the first coordinate component and the second coordinate component according to the distance and a pixel amount occupied by the display bezel in the image. In some embodiments, in response to the display bezel in the image being incomplete, the controller 160 determines the first coordinate component and the second coordinate component according to the tilt status, the distance, and the pixel amount. In some embodiments, the controller 160 may obtain the first coordinate component and the second coordinate component of the stylus 100 in the world coordinate system through a lookup table according to the tilt status, the distance, and the pixel amount occupied by the display bezel in the image.

Figure 6B:
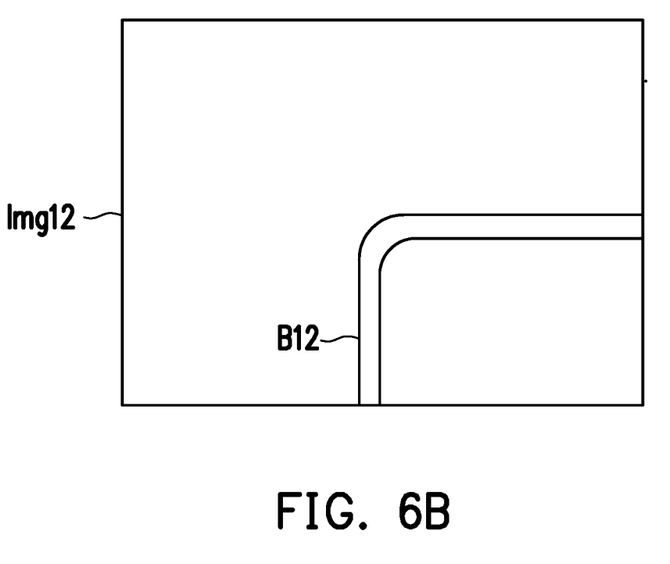

FIG. 6B is a schematic view of a display bezel in an image according to an embodiment of the disclosure. Referring to FIG. 6B, the controller 160 may determine that a display bezel B12 in an image Img12 is incomplete. Thus, the controller 160 performs table lookup according to the tilt status, the distance, and the pixel amount occupied by the display bezel B12 of the stylus 100 to determine the first coordinate component and the second coordinate component.

For example, the controller 160 may determine the X coordinate component and the Y coordinate component of the stylus 100 in the world coordinate system according to Table 1 below. Table 1 may be established based on prior tests and experiments.

TABLE 1

| Distance | Pixel amount of display bezel | Tilt status | X coordinate component | Y coordinate component |
|---|---|---|---|---|
| D1(cm) | A | θ1 | x1 | y1 |
| D2(cm) | B | θ1 | x2 | y2 |
| D3(cm) | C | θ1 | x3 | y3 |
| D4(cm) | D | θ1 | x4 | y4 |
| D1(cm) | E | θ2 | x5 | y5 |
| D2(cm) | F | −θ2 | x6 | y6 |
| D3(cm) | G | θ3 | x7 | y7 |
| D4(cm) | H | −θ4 | x8 | y8 |

In step S460, the controller 160 determines the third coordinate component on the third axial direction according to the distance. Specifically, according to the depth sensing data provided by the distance sensor 120, the controller 160 may determine the distance between the stylus 100 and the display 200. Thus, the controller 160 may determine the Z coordinate component of the stylus 100 in the world coordinate system according to the distance.

In step S470, the controller 160 maps the spatial position of the stylus to the screen coordinate according to the spatial position and the tilt status of the stylus 100. In some embodiments, after obtaining the spatial position of the stylus 100 in the world coordinate system and the tilt status of the stylus 100, the controller 160 may project the spatial position of the stylus 100 onto the display plane in the pointing direction of the stylus 100 to obtain a screen coordinate, so that the stylus 100 may interact with the electronic device including the display 200 according to the screen coordinate. For example, a 3D object model displayed on the display 200 is dragged or rotated according to the screen coordinate.

However, the implementation of the disclosure is not limited to the above description, and the content of the above embodiment may be modified according to actual needs. For example, in some embodiments of the disclosure, the spatial position of the stylus 100 may be determined according to the sensing data of various sensors, so as to further improve the estimation accuracy.

Figure 7:
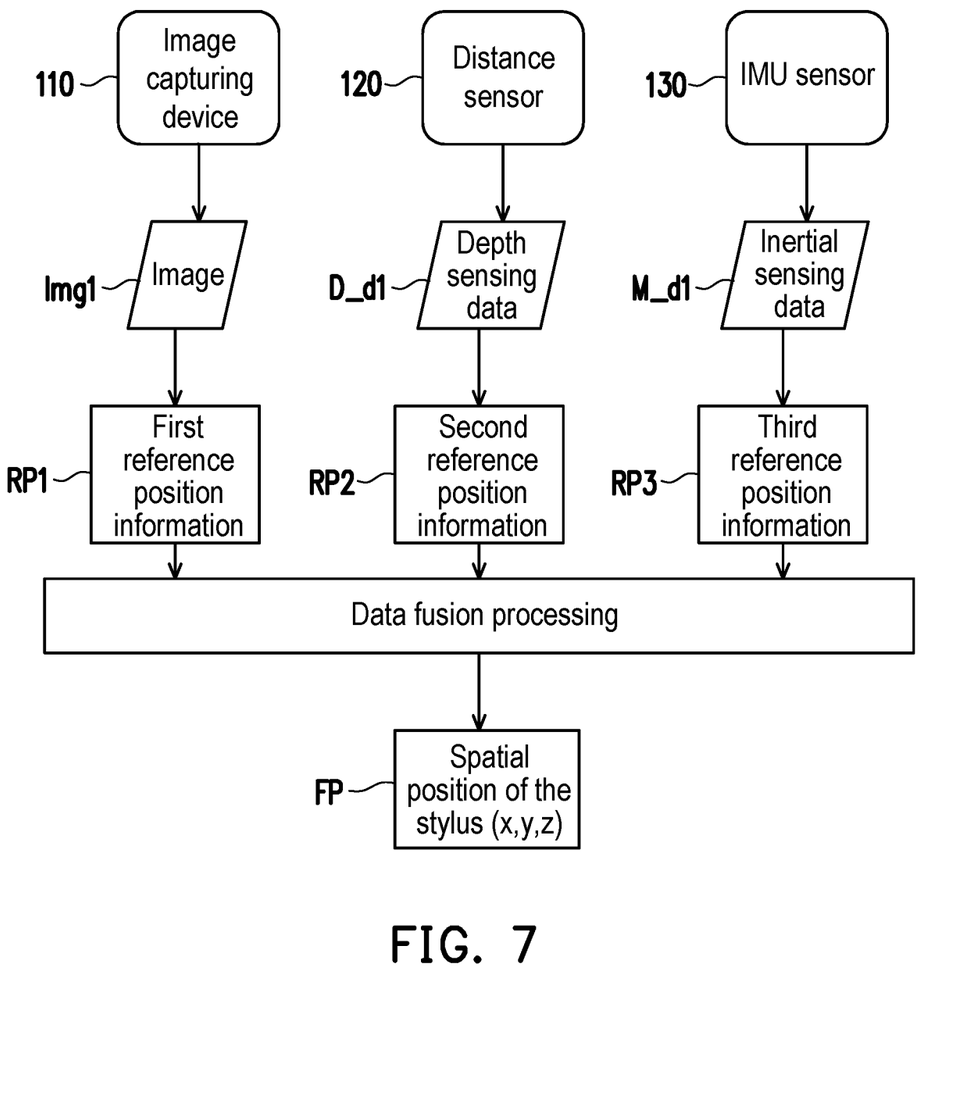
FIG. 7 is a schematic view of a spatial position of a stylus determined according to an embodiment of the disclosure.

FIG. 7 is a schematic view of a spatial position of a stylus determined according to an embodiment of the disclosure. Referring to FIG. 7, in some embodiments, the image capturing device 100 may capture the image Img1 toward the display 200. The controller 160 may determine first reference position information RP1 of the stylus 100 relative to the display 200 according to the display bezel in the image. The first reference position information RP1 may include the 3D coordinate position of the stylus 100 in the world coordinate system. Furthermore, according to the position information and dimension of the display bezel in the image Img1, the controller 160 may estimate the 3D coordinate position of the stylus 100 in the world coordinate system.

On the other hand, the distance sensor 120 is a multi-zone TOF distance sensor, which may output depth sensing data D_d1. The controller 160 may determine second reference position information RP2 of the stylus 100 relative to the display 200 according to depth sensing data D_d1 of the multi-zone TOF distance sensor. The second reference position information RP2 may include the distance between the stylus 100 and the display 200. In addition, the second reference position information RP2 may include the tilt status of the stylus 100. In addition, since the depth sensing data D_d1 may be used to determine whether the distance sensor 120 detects the display bezel, the second reference position information RP2 may include the X coordinate component and the Y coordinate component of the stylus 100 in the world coordinate system.

In addition, the IMU sensor 130 may output inertial sensing data M_d1. The controller 160 may determine third reference position information RP3 of the stylus 100 relative to the display 200 according to inertial sensing data M_d1 of the IMU sensor 130. The third reference position information RP31 includes the 3D coordinate position of the stylus 100 in the world coordinate system and the tilt status of the stylus 100.

Based on this, the controller 160 may determine a spatial position FP of the stylus 100 relative to the display 200 according to the first reference position information RP1, the second reference position information RP2, and the third reference position information RP3. Specifically, the controller 160 may perform data fusion and prediction related processing according to the first reference position information RP1, the second reference position information RP2, and the third reference position information RP3, so as to obtain an accurate spatial position FP. For example, the controller 160 may give different weighting values to the first reference position information RP1, the second reference position information RP2, and the third reference position information RP3 and perform data fusion by weighting and processing the first reference position information RP1, the second reference position information RP2, and the third reference position information RP3 to obtain the spatial position FP of the stylus 100 relative to the display 200. Alternatively, the controller 160 may use the second reference position information RP2 and the third reference position information RP3 to adjust the first reference position information RP1 to obtain the spatial position FP of the stylus 100 relative to the display 200. Alternatively, in response to the frame capture frequency of the image capturing device 100 being low, the spatial position FP of the stylus 100 relative to the display 200 may be updated through the inertial sensing data M_d1 of the IMU sensor 130.

To sum up, in the embodiment of the disclosure, the image capturing device disposed on the stylus may capture the image towards the display, and the distance sensor may detect the distance between the stylus and the display. According to the display bezel of the display in the image and the distance, the spatial position of the stylus relative to the display may be estimated. Thus, the spatial position of the stylus relative to the display may be used to execute control functions, so as to increase the diversification of the usage of the stylus. In addition, by using the sensing data of various sensors on the stylus, the estimation accuracy of the spatial position of the stylus relative to the display may be further improved.

Although the disclosure has been described in detail with reference to the above embodiments, they are not intended to limit the disclosure. Those skilled in the art should understand that it is possible to make changes and modifications without departing from the spirit and scope of the disclosure. Therefore, the protection scope of the disclosure shall be defined by the following claims.

What is claimed is:

1. A method for estimating stylus position, comprising:
    capturing an image towards a display through an image capturing device disposed on a stylus;
    detecting a distance between the stylus and the display through a distance sensor disposed on the stylus;
    detecting a display bezel of the display in the image; and
    determining a spatial position of the stylus relative to the display according to the display bezel in the image and the distance,
    wherein the spatial position comprises a first coordinate component, a second coordinate component, and a third coordinate component, and determining the spatial position of the stylus relative to the display according to the display bezel in the image and the distance comprises;
    determining the first coordinate component on a first axial direction and the second coordinate component on a second axial direction according to the display bezel in the image; and
    determining the third coordinate component on a third axial direction according to the distance, wherein the third axial direction is a normal direction of a display plane of the display, and the first axial direction, the second axial direction, and the third axial direction are perpendicular to each other.

2. The method for estimating stylus position according to claim 1, wherein determining the first coordinate component on the first axial direction and the second coordinate component on the second axial direction according to the display bezel in the image comprises:
    determining whether the display bezel in the image is complete; and
    determining the first coordinate component on the first axial direction and the second coordinate component on the second axial direction according to the distance and a pixel amount occupied by the display bezel in the image in response to the display bezel in the image being incomplete.

3. The method for estimating stylus position according to claim 2, wherein determining the first coordinate component on the first axial direction and the second coordinate component on the second axial direction according to the display bezel in the image further comprises:
  determining the first coordinate component on the first axial direction and the second coordinate component on the second axial direction according to position information of the display bezel in the image in response to the display bezel in the image being complete.

4. The method for estimating stylus position according to claim 2, further comprising:
  detecting a tilt status of the stylus, wherein
  determining the first coordinate component on the first axial direction and the second coordinate component on the second axial direction according to the distance and the pixel amount occupied by the display bezel in the image in response to the display bezel in the image being incomplete comprises:
    determining the first coordinate component and the second coordinate component according to the tilt status, the distance, and the pixel amount in response to the display bezel in the image being incomplete.

5. The method for estimating stylus position according to claim 4, wherein an inertial measurement unit sensor is disposed on the stylus for detecting the tilt status of the stylus.

6. The method for estimating stylus position according to claim 4, wherein the distance sensor comprises a multi-zone TOF distance sensor, and the multi-zone TOF distance sensor is configured to detect the tilt status of the stylus.

7. The method for estimating stylus position according to claim 1, wherein the image capturing device comprises a fisheye lens, the image comprises a fisheye image, and detecting the display bezel of the display in the image comprises:
  performing image calibration processing on the fisheye image according to the distance to obtain a calibrated image; and
  detecting the display bezel of the display in the calibrated image.

8. The method for estimating stylus position according to claim 1, wherein the distance sensor comprises a multi-zone TOF distance sensor, and an inertial measurement unit sensor is disposed on the stylus, and determining the spatial position of the stylus relative to the display according to the display bezel in the image and the distance comprises:
  determining first reference position information of the stylus relative to the display according to the display bezel in the image;
  determining second reference position information of the stylus relative to the display according to depth sensing data of the multi-zone TOF distance sensor;
  determining third reference position information of the stylus relative to the display according to inertial sensing data of the inertial measurement unit sensor; and
  determining the spatial position of the stylus relative to the display according to the first reference position information, the second reference position information, and the third reference position information.

9. A stylus, comprising:
  an image capturing device;
  a distance sensor; and
  a controller, coupled to the image capturing device and the distance sensor and is configured to:
    capture an image towards a display through the image capturing device disposed on the stylus;
    detect a distance between the stylus and the display through the distance sensor disposed on the stylus;
    detect a display bezel of the display in the image; and
    determine a spatial position of the stylus relative to the display according to the display bezel in the image and the distance,
  wherein the spatial position comprises a first coordinate component, a second coordinate component, and a third coordinate component, and the controller is further configured to:
    determine the first coordinate component on a first axial direction and the second coordinate component on a second axial direction according to the display bezel in the image; and
    determine the third coordinate component on a third axial direction according to the distance, wherein the third axial direction is a normal direction of a display plane of the display, and the first axial direction, the second axial direction, and the third axial direction are perpendicular to each other.

10. The stylus according to claim 9, wherein the controller is further configured to:
  determine whether the display bezel in the image is complete;
  determine the first coordinate component on the first axial direction and the second coordinate component on the second axial direction according to the distance and a pixel amount occupied by the display bezel in the image in response to the display bezel in the image being incomplete; and
  determine the first coordinate component on the first axial direction and the second coordinate component on the second axial direction according to position information of the display bezel in the image in response to the display bezel in the image being complete.

11. The stylus according to claim 10, wherein controller is further configured to:
  detect a tilt status of the stylus, wherein
  determine the first coordinate component on the first axial direction and the second coordinate component on the second axial direction according to the distance and the pixel amount occupied by the display bezel in the image in response to the display bezel in the image being incomplete comprises:
    determine the first coordinate component and the second coordinate component according to the tilt status, the distance, and the pixel amount in response to the display bezel in the image being incomplete.

12. The stylus according to claim 11, wherein an inertial measurement unit sensor is disposed on the stylus for detecting the tilt status of the stylus, and the distance sensor comprises a multi-zone TOF distance sensor, and the multi-zone TOF distance sensor is configured to detect the tilt status of the stylus.

13. The stylus according to claim 9, wherein the image capturing device comprises a fisheye lens, the image comprises a fisheye image, and the controller is further configured to:
  perform image calibration processing on the fisheye image according to the distance to obtain a calibrated image; and
  detect the display bezel of the display in the calibrated image.

14. The stylus according to claim 9, wherein the distance sensor comprises a multi-zone TOF distance sensor, and an inertial measurement unit sensor is disposed on the stylus, and the controller is further configured to:
  determine first reference position information of the stylus relative to the display according to the display bezel in the image;

determine second reference position information of the stylus relative to the display according to depth sensing data of the multi-zone TOF distance sensor;

determine third reference position information of the stylus relative to the display according to inertial sensing data of the inertial measurement unit sensor; and determine the spatial position of the stylus relative to the display according to the first reference position information, the second reference position information, and the third reference position information.

15. A method for estimating stylus position, comprising:

capturing an image towards a display through an image capturing device disposed on a stylus;

detecting a distance between the stylus and the display through a distance sensor disposed on the stylus;

detecting a display bezel of the display in the image; and determining a spatial position of the stylus relative to the display according to the display bezel in the image and the distance, wherein the distance sensor comprises a multi-zone TOF distance sensor, and an inertial measurement unit sensor is disposed on the stylus, and determining the spatial position of the stylus relative to the display according to the display bezel in the image and the distance comprises:

determining first reference position information of the stylus relative to the display according to the display bezel in the image;

determining second reference position information of the stylus relative to the display according to depth sensing data of the multi-zone TOF distance sensor;

determining third reference position information of the stylus relative to the display according to inertial sensing data of the inertial measurement unit sensor; and determining the spatial position of the stylus relative to the display according to the first reference position information, the second reference position information, and the third reference position information.

* * * * *